(12) United States Patent
Hyung et al.

(10) Patent No.: US 11,099,762 B2
(45) Date of Patent: Aug. 24, 2021

(54) MULTI HOST CONTROLLER AND SEMICONDUCTOR DEVICE INCLUDING THE SAME

(71) Applicant: SAMSUNG ELECTRONICS CO., LTD., Suwon-si (KR)

(72) Inventors: Nam Taek Hyung, Seoul (KR); Mi Kyung Kim, Hwaseong-si (KR); Jeong Hoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 16/549,670

(22) Filed: Aug. 23, 2019

(65) Prior Publication Data

US 2020/0159439 A1 May 21, 2020

(30) Foreign Application Priority Data

Nov. 15, 2018 (KR) ........................ 10-2018-0140694

(51) Int. Cl.
| | | |
|---|---|---|
| G06F 3/06 | (2006.01) | |
| G06F 13/16 | (2006.01) | |
| G06F 9/455 | (2018.01) | |
| G06F 13/40 | (2006.01) | |

(52) U.S. Cl.
CPC .......... *G06F 3/0647* (2013.01); *G06F 3/0604* (2013.01); *G06F 3/0679* (2013.01); *G06F 9/45558* (2013.01); *G06F 13/1668* (2013.01); *G06F 13/4027* (2013.01)

(58) Field of Classification Search
CPC ............. G06F 13/1668; G06F 13/4027; G06F 2009/45579; G06F 2009/45595; G06F 3/0604; G06F 3/061; G06F 3/0647; G06F 3/0659; G06F 3/0679; G06F 9/45558
See application file for complete search history.

(56) References Cited

U.S. PATENT DOCUMENTS

| | | |
|---|---|---|
| 7,617,368 B2 | 11/2009 | Van Dyke et al. |
| 8,271,746 B1 | 9/2012 | Hutsell et al. |
| 8,661,180 B2 | 2/2014 | Takagi et al. |
| 9,280,502 B1 | 3/2016 | Ju |
| 9,740,409 B2 | 8/2017 | Kanigicherla et al. |
| 2016/0216898 A1 | 7/2016 | Dorfman et al. |

*Primary Examiner* — Yong J Choe
(74) *Attorney, Agent, or Firm* — Volentine, Whitt & Francos, PLLC

(57) ABSTRACT

A semiconductor device: includes a plurality of I/O clients; a multi host controller which includes a physical host interface, a virtual host interface, an arbiter; and a system memory. The arbiter receives first transfer requests from a first one of the I/O clients via the physical host interface and receives second transfer requests from a second one of the I/O clients via the virtual host interface, and arbitrates the first transfer requests and second transfer requests. The system memory stores a first transfer request list of the first transfer requests and a second transfer request list of the second transfer requests, wherein the first and second transfer request lists include the same number of slots.

20 Claims, 9 Drawing Sheets

MULTI HOST CONTROLLER AND SEMICONDUCTOR DEVICE INCLUDING THE SAME

CROSS-REFERENCE TO RELATED APPLICATIONS

This application claims the benefit of priority under 35 U.S.C. 119 to Korean Patent Application No. 10-2018-0140694, filed on Nov. 15, 2018, in the Korean Intellectual Property Office, the disclosures of which are incorporated by reference in their entireties herein.

BACKGROUND

The present invention relates to a multi host controller and a semiconductor device including the same, more specifically, to a multi host controller that provides virtualization technology, and a semiconductor device including the same.

The virtualization technology may provide a physical device to a plurality of guest operating systems. The virtualization technology may be implemented as a full-virtualization technology in which the guest operating system may directly provide an environment for controlling the physical device, a para-virtualization technology which requires an intermediate operating system, between the guest operating system and the physical device for processing the usage request of the physical device by the guest operating system, and the like.

The full-virtualization technology has a great advantage in that there is no need for modification of the guest operating system kernel, unlike para-virtualization technology, but in order to ensure scalability such as support of various kinds and numbers of guest operating systems, implementation complexity is high and cost is high.

Such virtualization technologies may also be applied to multi host environments and development of interfaces of multi host controllers is also possible.

SUMMARY

Aspects of the present invention provide a semiconductor device capable of improving the performance of a multi host system.

Aspects of the present invention also provide a multi host controller capable of improving the performance of a multi host system.

However, aspects of the present invention are not restricted to the ones set forth herein. The above and other aspects of the present invention will become more apparent to one of ordinary skill in the art to which the present invention pertains by referencing the detailed description given below.

According to an exemplary embodiment of the present inventive concept, there is provided a semiconductor device. The semiconductor device includes a plurality of I/O clients, a virtual machine monitor, a multi host controller, and a system memory. The multi host interface includes a physical host interface, at least one virtual host interface, and an arbiter. The physical host interface and the at least one virtual host interface each interface a corresponding one of the plurality I/O clients to the virtual machine monitor, The arbiter is configured to receive first transfer requests from the physical host interface and to receive second transfer requests from the at least one virtual host interface, to arbitrate the first transfer request and the second transfer request. The system memory is configured to store a first transfer request list of the first transfer requests and a second transfer request list of the second transfer requests. The first and second transfer request lists include the same number of slots as each other.

According to another exemplary embodiment of the present inventive concept, there is provided a multi host controller. The multi host controller includes a physical host interface which transfers n first transfer requests, a first virtual host interface which transfers n second transfer requests, a second virtual host interface which transfers n third transfer requests; and an arbiter which receives 3n first to third transfer requests, and arranges and transfers n first to third transfer requests.

According to yet another exemplary embodiment of the present inventive concept, there is provided a semiconductor device. The semiconductor device includes a flash memory device and a system on chip (SoC) device which transfers a command to the flash memory device. The SoC device includes a plurality of I/O clients, a virtual machine monitor, a multi host controller, and a system memory. The multi host controller includes a physical host interface, a virtual host interface, and an arbiter. The physical host interface and the at least one virtual host interface each interface a corresponding one of the plurality I/O clients to the virtual machine monitor. The arbiter is configured to receiver first transfer requests from the physical host interface and to receive a second transfer request from the at least one virtual host interface, and to arbitrate the first transfer requests and the second transfer requests. The system memory is configured to store a first transfer request list of the first transfer requests and a second transfer request list of the second transfer requests.

According to still another exemplary embodiment of the present inventive concept there is provides a device, comprising: a flash memory device; a plurality of input/output (I/O) clients which each are configured to exchange data with the flash memory device; a virtual machine monitor configured to provide a virtualization function for the plurality of I/O clients; a plurality of interfaces, wherein each of the interfaces is configured to interface between a corresponding one of the I/O clients and the virtual machine monitor; an arbiter configured to receive first transfer requests from the a first interface among the plurality of interfaces and to receive second transfer requests from a second interface among the plurality of interfaces, and which is further configured to arbitrate the first transfer requests and the second transfer requests; and a system memory which is configured to store a first transfer request list of the first transfer requests and a second transfer request list of the second transfer requests. The first transfer request list and the second transfer request list include a same number of transfer request slots as each other.

BRIEF DESCRIPTION OF THE DRAWINGS

The above and other aspects and features of the present invention will become more apparent by describing in detail exemplary embodiments thereof with reference to the attached drawings.

DETAILED DESCRIPTION OF THE EMBODIMENTS

Hereinafter, a semiconductor device according to some embodiments will be described with reference to FIGS. 1, 2, 3a, 3b, and 4-6.

Figure 1:
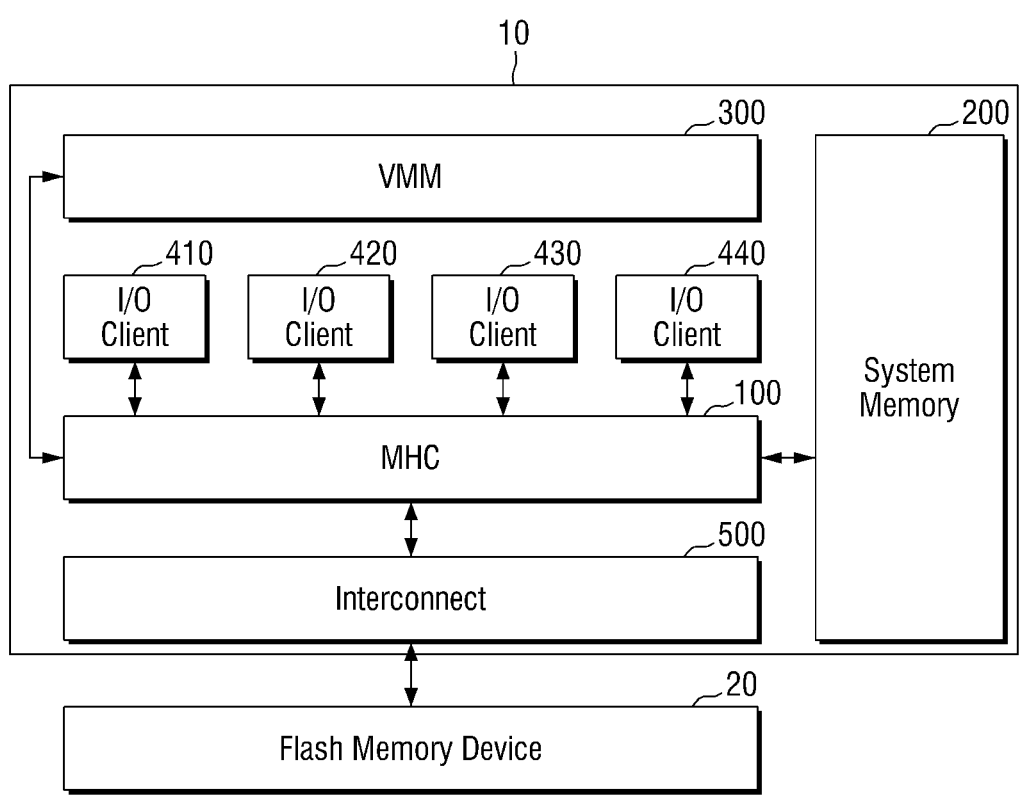
FIG. 1 is a block diagram for explaining a semiconductor device according to some embodiments.

FIG. 1 is a block diagram for explaining the semiconductor device according to some embodiments.

Referring to FIG. 1, the semiconductor device according to some embodiments includes a System-on-a-Chip (SOC) device 10 and a flash memory device 20.

SoC device 10 may control the input/output operation to the single flash memory device 20. SoC device 10 may provide data to be written to flash memory device 20 and read data from flash memory device 20.

Flash memory device 20 may be a non-volatile data storage medium in which data may be electrically written and erased. Flash memory device 20 may comprise any of various flash memory-based storage devices, including a memory card, a solid state drive (SSD) and a universal serial bus (USB) flash drive.

The flash memory-based storage devices may provide fast read and write times, comparable with a dynamic random access memory (DRAM), while providing higher durability and shock resistance than a conventional hard disk drive (HDD).

Many standards have been developed or are currently under development to facilitate the widespread use of the flash memory-based storage devices. One of such standards is universal flash storage (UFS) developed by JEDEC (Joint Electron Device Engineering Council) for flash memory-based storage in mobile devices such as smart phones and tablet computers.

UFS adopts a command protocol and a small computer system interface (SCSI) architecture model which support multi-commands having the characteristics of a command queue, thereby enabling a multi-thread programming paradigm.

Another standard developed by JEDEC is the embedded MultiMediaCard (eMMC) standard, which provides a simplified application interface design, a small package size and low power consumption. The eMMC flash memory-based storage devices are one of the main forms of storage in the current mobile devices.

Flash memory device 20 may use a flash memory-based storage device standard such as UFS or eMMC. However, the present embodiment is not limited to thereto.

Flash memory device 20 may also be built to be adjacent to SoC device 10. Alternatively, flash memory device 20 may also achieve the function when being coupled to SoC device 10 as a detachable memory device.

Specifically, SoC device 10 may include a plurality of I/O clients 410, 420, 430 and 440, a virtual machine monitor 300, a multi host controller (MHC), a system memory 200 and an interconnect 500.

The plurality of I/O clients 410, 420, 430 and 440 may include a first I/O client 410, a second I/O client 420, a third I/O client 430 and a fourth I/O client 440. Although four I/O clients are illustrated in the drawings, this is merely an example, and the present embodiment is not limited thereto. For example, the semiconductor device according to the present embodiment may include eight or sixteen I/O clients rather than four.

The plurality of I/O clients 410, 420, 430 and 440 may include a host software entity (e.g., first I/O client 410) executed on a processor of SoC device 10 and/or a sub-system of SoC device 10, respectively.

Virtual machine monitor 300 may be executed by a processor of SoC device 10. Virtual machine monitor 300 may be a software module residing in system memory 200 or other memory.

Virtual machine monitor 300 may provide virtualization functions and management on a plurality of I/O clients 410, 420, 430 and 440. That is, a visualization environment in which the plurality of I/O clients 410, 420, 430 and 440 may individually interact with single flash memory device 20 may be created through virtual machine monitor 300.

The standards for the flash memory-based storage devices such as the universal flash storage and the eMMC are generally designed for management and use by a single input/output I/O client.

However, the semiconductor device of FIG. 1 according to some embodiments may simultaneously support the plurality of I/O clients 410, 420, 430 and 440, using a virtualization environment. The plurality of I/O clients 410, 420, 430 and 440 may be, for example, hosts or processor sub-systems.

In such a virtualization environment, the plurality of I/O clients 410, 420, 430 and 440 may interact with flash memory device 20, as if they were the only host of flash memory device 20. That is, each of the I/O clients 410, 420, 430 and 440 may not recognize other I/O clients and may interact with flash memory device 20 on one-to-one basis.

Likewise, when communicating with the plurality of I/O clients 410, 420, 430 and 440, flash memory device 20 may operate as if it communicates with a single I/O client.

Multi host controller 100 may act as an intermediary between the plurality of I/O clients 410, 420, 430 and 440 and flash memory device 20. Specifically, multi host controller 100 may provide a virtual interface to the plurality of I/O clients 410, 420, 430 and 440 via virtual machine monitor 300.

To this end, multi host controller 100 may provide a transfer request list (TRL) including a plurality of "slots" (or a task descriptor list (TDL) including a plurality of task descriptors (TD)). The slots may be used by the plurality of I/O clients 410, 420, 430 and 440 to issue the transfer request (TR), such as read/write transactions, to flash memory device 20. This will be described in more detail below.

System memory 200 may store a software module or other data as a memory existing in SoC device 10. Virtual machine monitor 300 may also reside in system memory 200. Further, the aforementioned transfer request list may also be stored in system memory 200.

System memory 200 may provide the stored transfer request list to multi host controller 100, and multi host controller 100 may receive the transfer request from the plurality of I/O clients 410, 420, 430 and 440 via system memory 200.

Interconnect 500 may perform physical communication between flash memory device 20 and multi host controller 100. Interconnect 500 may be used as a pipeline for processing units of data. Interconnect 500 may include, for example, a transfer layer such as MIPI UniPro and MIPI M-PHY. However, the present embodiment is not limited thereto.

Figure 2:
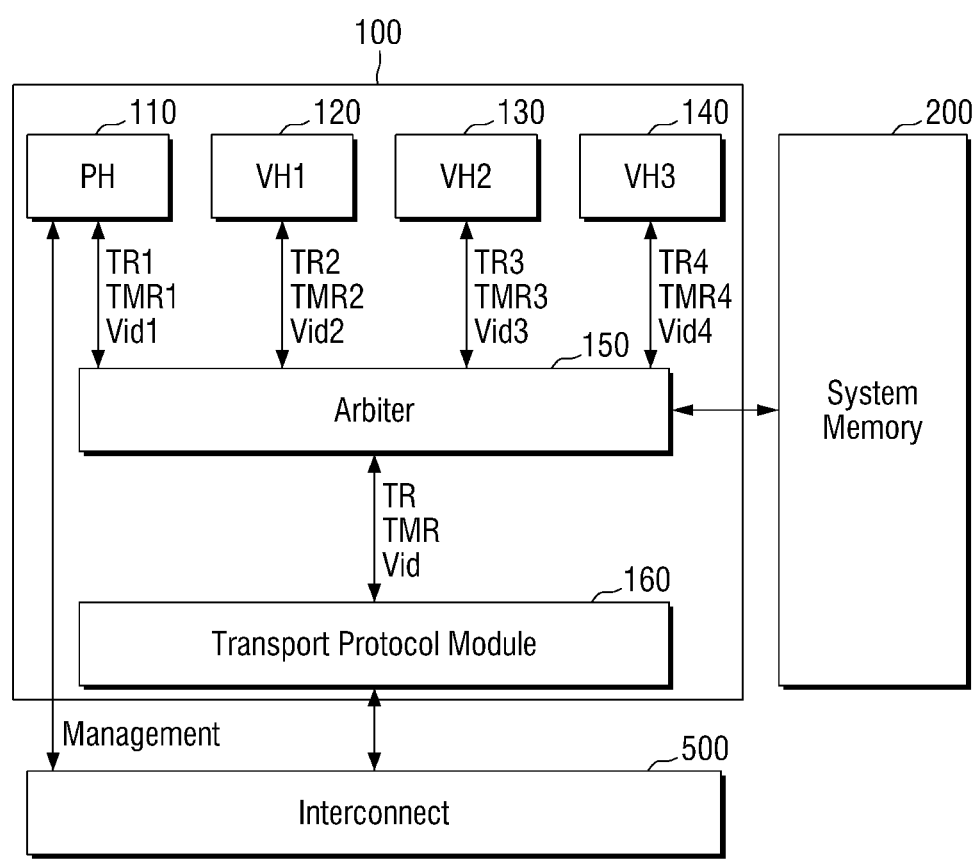
FIG. 2 is a block diagram for explaining a multi host controller of FIG. 1 in detail.

FIG. 2 is a block diagram for explaining the multi host controller of FIG. 1 in detail.

Referring to FIG. 2, multi host controller 100 may include a physical host interface 110, a first virtual host interface 120, a second virtual host interface 130, a third virtual host interface 140, an arbiter 150 and a transport protocol module 160.

Physical host interface 110 may be an interface capable of communicating with virtual machine monitor 300. Also, physical host interface 110 may be an interface capable of communicating with corresponding parts of the plurality of I/O clients 410, 420, 430 and 440. Each interface includes a special function register (SFR), and may perform a doorbell execution.

Physical host interface 110 may transfer a first transfer request TR1, a first work management request TMR1 and a first virtual ID Vid1 to arbiter 150.

Physical host interface 110 may be in charge of managing interconnect 500. Physical host interface 110, for example, may determine whether the low power consumption mode of interconnect 500 is activated, and may control the operation of interconnect 500.

First virtual host interface 120, second virtual host interface 130, and third virtual host interface 140 are interfaces for the virtualization environment formed by virtual machine monitor 300. That is, first virtual host interface 120, second virtual host interface 130, and third virtual host interface 140 may be interfaces that may communicate with corresponding parts of the plurality of I/O clients 410, 420, 430 and 440, respectively.

Although three virtual host interfaces are illustrated in the drawings, this is merely an example, and the present embodiment is not limited thereto. That is, the number of virtual host interfaces may vary in this embodiment.

First virtual host interface 120 may transfer a second transfer request TR2, a second work management request TMR2 and a second virtual ID Vid2 to arbiter 150. Second virtual host interface 130 may transfer the third transfer request TR3, the third work management request TMR3 and the third virtual ID Vid3 to arbitrary 150. Third virtual host interface 140 may transfer a fourth transfer request TR4, a fourth work management request TMR4 and a fourth virtual ID Vid4 to arbitrary 150.

As described above, the first transfer request TR1 to the fourth transfer request TR4 may be requests such as read/write transactions on flash memory device 20. The transfer requests may be executed through slots of the transfer request list located in system memory 200.

Physical host interface 110 and virtual host interfaces 120 to 140 may use all slots of the transfer request list, respectively. That is, for example, when the slots of the transfer request list are defined to be 32, each of physical host interface 110 and virtual host interfaces 120 to 140 may utilize all 32 slots.

Therefore, in the case where the total number of physical host interface 110 and virtual host interfaces 120 to 140 is four, the number of transfer requests received by arbiter 150 may be 32*4=128 in total.

As a result, physical host interface 110 and virtual host interfaces 120 to 140 do not care about other host interfaces, and may transfer their own transfer requests without restriction.

Arbiter 150 may arbitrate the transfer requests TR transferred from physical host interface 110 and virtual host interfaces 120 to 140. That is, arbiter 150 may rearrange, relocate, remap and transfer the processing order of the transfer requests TR received from physical host interface 110 and virtual host interfaces 120 to 140. For example, upon receiving 4*32 transfer requests, arbiter 150 may transfer each of 32 transfer requests four times.

At this time, each of the 32 transfer requests TR transferred may not be transfer requests transferred from the same host interface. That is, the entire group of transfer requests may be mixed and relocated.

Arbiter 150 may perform the same work not only for the transfer request TR but also for a work management request TMR. A work management request TMR, including the first work management request TMR1 to the fourth work management request TMR4, may be an inquiry or a non-operation (NOP) command, unlike the transfer request (TR). The work management requests may be executed through the slots of the work management request list located in system memory 200.

Physical host interface 110 and virtual host interfaces 120 to 140 may use all the slots of the work management request list, respectively. That is, for example, when eight work management request list slots are defined, each of physical host interface 110 and virtual host interfaces 120 to 140 may utilize all the eight slots.

Accordingly, in the case where a total number of the physical host interface 110 and the virtual host interfaces 120 to 140 is four, the number of work management requests received by arbiter 150 may be 8*4=32 in total.

Accordingly, physical host interface 110 and virtual host interfaces 120 to 140 do not care about other host interfaces, and may transfer their own work management request without restriction, respectively.

Arbiter 150 may arbitrate the work management requests TMR transferred from physical host interface 110 and virtual host interfaces 120 to 140. That is, arbiter 150 may rearrange, relocate, remap and transfer the processing order of the work management requests TMR received from physical host interface 110 and virtual host interfaces 120 to 140.

For example, upon receiving 4*8 work management requests, arbiter 150 may transfer each of 8 work management requests four times. At this time, the 8 work management requests TMR transferred may not be work management requests transferred from the same host interface. That is, the entire group of work management requests may be mixed and relocated.

If physical host interface 110 and virtual host interfaces 120 to 140 dividedly used the transfer request list having a total of 32 slots and the work management list having a total of eight slots, respectively, software of physical host interface 110 and virtual host interfaces 120 to 140 may not be mutually compatible with each other, and may have different structures.

Unlike this, since physical host interface 110 and virtual host interfaces 120 to 140 of the semiconductor device of FIG. 1 according to some embodiments may similarly use slots of the transfer request list and the work management request lists, the software may be compatible with each other.

Therefore, it is not necessary to separately develop respective software of each of physical host interface 110 and virtual host interfaces 120 to 140, and the same function may be executed via a single piece of software.

Accordingly, it is possible to minimize the development cost and the development period of the software and to improve the performance of the semiconductor device.

Furthermore, the I/O clients corresponding to each virtual machine, that is, physical host interface 110 and virtual host interfaces 120 to 140 do not restrictively transfer the transfer requests and the work management requests, but may completely transfer them, so there may be no limitation on its performance at all.

That is, each of the plurality of I/O clients 410, 420, 430 and 440 is designed to transfer the 32 transfer requests and the 8 work management requests, but may transfer a total of 32 transfer requests and 8 work management requests through a plurality of attempts instead of once by the restricted slots of the transfer requests and the work management request lists. A standby time between each attempt occurs accordingly, and the occurrence of the standby time may degrade the overall performance of each of the plurality of I/O clients 410, 420, 430 and 440.

However, in the semiconductor device according to this embodiment, since each of physical host interface 110 and virtual host interfaces 120 to 140 may transfer 32 transfer requests and 8 work management requests, performance degradation of plurality of I/O clients 410, 420, 430 and 440 may not occur.

That is, the semiconductor device according to some embodiments does not restrict the interfaces of virtual host interfaces 120 to 140 and physical host interface 110, and instead, arbiter 150 may arbitrate the interfaces to improve the overall operation performance.

Transport protocol module 160 may receive the rearranged transfer requests TR and the work management requests TMR from arbiter 150. Transport protocol module 160 may also receive the virtual ID Vid from arbiter 150. The virtual ID Vid may include a first virtual ID Vid1, a second virtual ID Vid2, and a third virtual ID Vid3.

Transport protocol module 160 may be, for example, a Micro Transport Protocol (μTP) engine or an eMMC transport protocol engine. Transport protocol module 160 may exchange commands and responses with flash memory device 20 via interconnect 500.

Figure 3A:
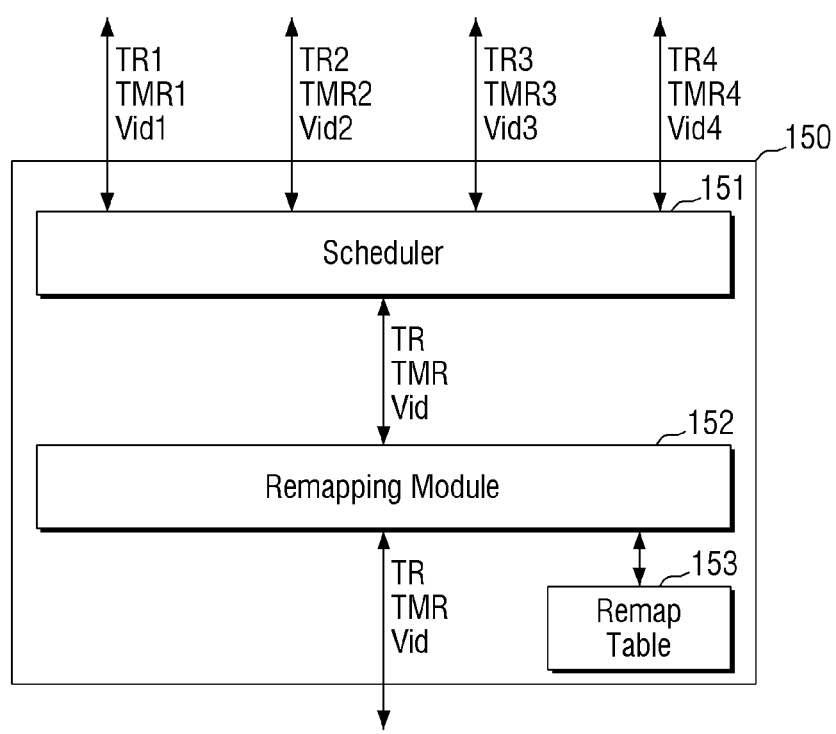
FIG. 3a is a block diagram for explaining one embodiment of the arbiter of multi host controller of FIG. 2 in detail.

FIG. 3a is a block diagram for explaining one embodiment of the arbiter of FIG. 2 in detail.

Arbiter 150 may include a scheduler 151, a remapping module 152 and a remap table 153.

Scheduler 151 may receive the first transfer request TR1 to the fourth transfer request TR4, the first work management request TMR1 to the fourth work management request TMR4, and the first virtual ID Vid1 to the fourth virtual ID Vid4 from physical host interface 110 and virtual host interfaces 120 to 140.

Scheduler 151 may relocate the first transfer requests TR1 to the fourth transfer requests TR4. For example, where the number of each of the first transfer requests TR1 to fourth transfer requests TR4 is 32, scheduler 151 may relocate a total of 128 transfer requests and arrange the 32 transfer requests at a time.

Scheduler 151 may relocate or rearrange the first transfer requests TR1 to the fourth transfer requests TR4, for example, in a round-robin manner. Alternatively, in the semiconductor device of FIG. 1 according to some embodiments, scheduler 151 may relocate or rearrange the first transfer requests TR1 to the fourth transfer requests TR4 in another efficient manner.

Similarly, scheduler 151 may relocate or rearrange the first work management requests TMR1 to the fourth work management requests TMR4. For example, if the number of each of the first work management requests TMR1 to the fourth work management requests TMR4 is 8, scheduler 151 may relocate or rearrange a total of 32 transfer requests and arrange the 8 transfer requests at a time.

Scheduler 151 may relocate the first transfer requests TR1 to the fourth transfer requests TR4, for example, in a round-robin manner. However, the present embodiment is not limited thereto.

Remapping module 152 may receive the relocated transfer requests TR, the relocated work management requests TMR and the virtual ID Vid from scheduler 151.

Remapping module 152 may combine the respective transfer requests TR and work management requests TMR with the virtual ID Vid and remap them. For example, when a first transfer request of the first transfer request TR1 transferred from physical host interface 110 identified by the first virtual ID Vid1, and a first transfer request of the second transfer request TR2 transferred from first visual host interface 120 identified by the second virtual ID Vid2 are relocated, remapping may be required for identification so that the slots corresponding to the respective transfer requests do not overlap.

Remapping module 152 may generate a remap table 153. Remap table 153 may be a table in which the relocated transfer requests TR and work management requests TMR are matched with the virtual ID Vid.

Remapping module 152 may perform demapping when there is a response from flash memory device 20. That is, since remapping module 152 needs to identify to which host interface the response of the relocated transfer request TR and the work management request TMR is transferred, it is possible to perform demapping. The demapping may be executed by referring to remap table 153.

Remapping module 152 transfers a response of the transfer requests TR and the work management requests TMR for which the demapping is completed to scheduler 151 again, and scheduler 151 may identify the virtual ID Vid to transfer the response to a correct one of physical host interface 110, and first to third virtual host interfaces 140.

That is, scheduler 151 and remapping module 152 may be a module for transferring the transfer requests TR and the work management requests TMR, in the number restricted by the standard, to lower transport protocol module 160.

For example, when each of physical host interface 110, first virtual host interface 120, second virtual host interface 130, and third virtual host interface 140 transfers the 32 transfer requests TR and the 8 work management requests TMR to arbiter 150, arbiter 150 may actually receive the 128 transfer requests TR and the 32 work management requests TMR.

Since this number of transfer requests TR work management requests TMR may not be directly transferred to transport protocol module 160, the order needs to be defined again by scheduler 151, and to which host interface each transfer request TR and work management request TMR belongs needs to be marked by remapping module 152. Through this arrangement, the 32 work requests TR and the 8 work management requests TMR may be processed normally in terms of each host interface.

Figure 3B:
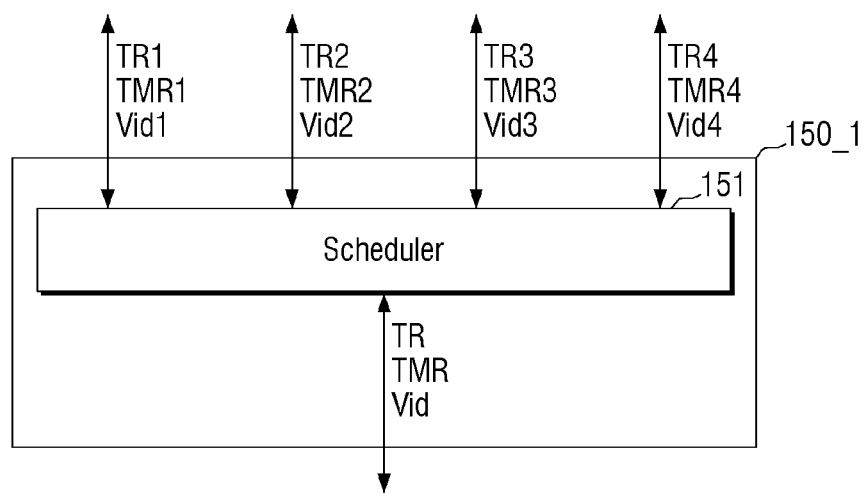
FIG. 3b is a block diagram for explaining another embodiment of the arbiter of multi host controller of FIG. 2 in detail.

FIG. 3b is a block diagram for explaining another embodiment of the arbiter of FIG. 2 in detail.

Referring to FIG. 3b, arbiter 150 of the semiconductor device of FIG. 1 according to some embodiments may include only scheduler 151. In the standard of the semiconductor device of FIG. 1 according to some embodiments, if the 32 work requests TR and the 8 work management requests TMR are allowed for each host interface (or for each virtual ID Vid), remapping module 152 and remap table 153 of FIG. 3a may not be required.

Therefore, in such a case, only scheduler 151 may be required to schedule the order of the respective transfer request TR and work management request TMR.

Figure 4:
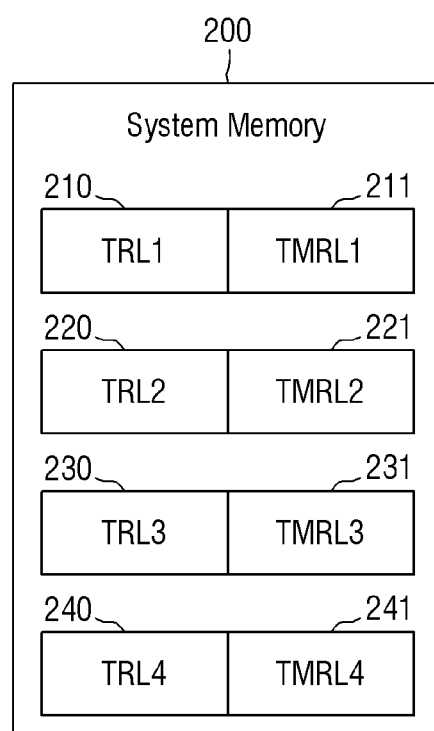
FIG. 4 is a block diagram for explaining a transfer request list and a work management request list in the system memory of FIG. 2.

FIG. 4 is a block diagram for explaining a transfer request list and a work management request list in the system memory of FIG. 2.

A first transfer request list 210, a second transfer request list 220, a third transfer request list 230 and a fourth transfer request list 240 may be stored in system memory 200. As described above, the transfer request list may be a description for executing each transfer request.

First transfer request list 210 may correspond to physical host interface 110, and second transfer request list 220 may correspond to first virtual host interface 120. Third transfer request list 230 may correspond to second virtual host interface 130 and fourth transfer request list 240 may correspond to third virtual host interface 140.

Similarly, first work management request list 211, second work management request list 221, third work management request list 231 and fourth work management request list 241 may be stored in system memory 200. As described above, the work management request list may be a description for executing each work management request.

First work management request list 211 may correspond to physical host interface 110, and second work management request list 221 may correspond to first virtual host interface 120. Third work management request list 231 may correspond to second virtual host interface 130, and fourth work management request list 241 may correspond to third virtual host interface 140.

That is, the transfer request list and the work management request list corresponding to physical host interface 110 and virtual host interfaces 120 to 140 may exist separately. This may be attributed to the fact that each of physical host interface 110 and virtual host interfaces 120 to 140 may use all the slots of the transfer request list and the work management request list.

Figure 5:
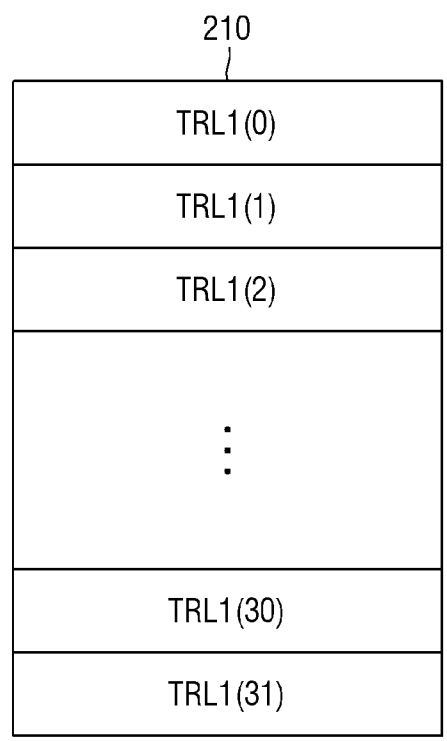
FIG. 5 is a block diagram for explaining a first transfer request list of FIG. 4 in detail.

FIG. 5 is a block diagram for explaining the first transfer request list of FIG. 4 in detail. First transfer request list 210 illustrated in FIG. 5 may have the same structure as other transfer request lists, that is, second transfer request list 220, third transfer request list 230, and fourth transfer request list 240. Therefore, for the sake of convenience, second transfer request list 220, third transfer request list 230 and fourth transfer request list 240 will not be separately described.

Referring to FIG. 5, the structure of first transfer request list 210 is made up of a total of 32 slots. Of course, the 32 slots illustrated in FIG. 5 is only an example, and first transfer request list 210 of this embodiment may have another number of slots. The number of slots may be defined depending on standards.

First transfer request list 210 may correspond to the first transfer requests TR1, respectively. That is, the first transfer requests TR1 transferred by physical host interface 110 may correspond to each slot of first transfer request list 210.

As described above, since physical host interface 110 transfers the same number of first transfer requests TR1 as the number of slots of first transfer request list 210, physical host interface 110 may interact with flash memory device 20 on one-to-one basis, irrespective of the presence of other host interfaces.

This may be similar for virtual host interfaces 120 to 140.

In the semiconductor device according to some embodiments, separate transfer request lists may exist for each of physical host interface 110 and virtual host interfaces 120 to 140. This is due to the fact that physical host interface 110 and virtual host interfaces 120 to 140 may fully utilize the slots of the transfer request lists.

Figure 6:
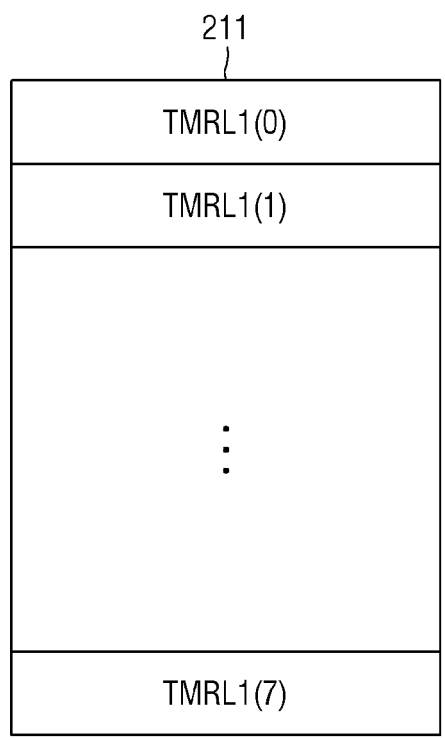
FIG. 6 is a block diagram for explaining the first work management request list of FIG. 4 in detail.

FIG. 6 is a block diagram for explaining the first work management request list of FIG. 4 in detail. First work management request list 211 explained in FIG. 6 may have the same structure as other work management request lists, that is, second work management request list 221, third work management request list 231, and fourth work management request 241. Therefore, for the sake of convenience, second work management request list 221, third work management request list 231 and fourth work management request list 241 will not be separately described.

Referring to FIG. 6, the structure of first work management request list 211 is made up of a total of eight slots. Of course, the eight slots illustrated in FIG. 6 is only an example, and first work management request list 211 of this embodiment may have other numbers of slots. The number of the slots may be defined depending on standards.

First work management request list 211 may correspond to the first work management request TMR1. That is, the first work management request TMR1 transferred by physical host interface 110 may correspond to each slot of the first work management request list 211.

As described above, since physical host interface 110 transfers the same number of first work management requests TMR1 as the number of slots of first work management request list 211, physical host interface 110 may interact with flash memory device 20 on one-to-one basis, irrespective of the presence of other host interfaces.

This may also be similar for virtual host interfaces 120 to 140.

In the semiconductor device according to some embodiments, separate work management request lists may exist for each of physical host interface 110 and virtual host interfaces 120 to 140. This is due to the fact that physical host interface 110 and virtual host interfaces 120 to 140 may fully utilize slots of the work management request lists.

Figure 7:
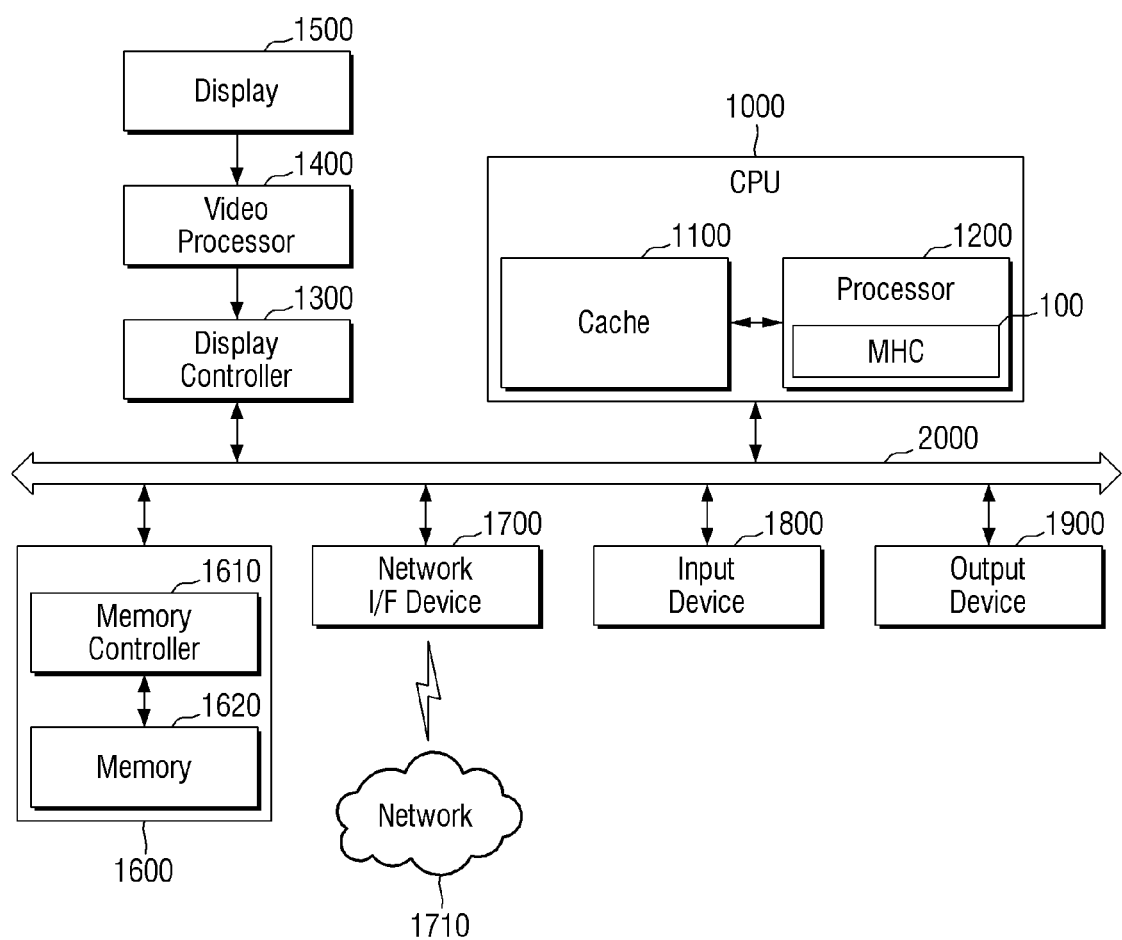
FIG. 7 is a block diagram of a system of a computing device system including a semiconductor device according to some embodiments.

FIG. 7 is a block diagram of a computing device system including the semiconductor device according to some embodiments. FIG. 7 illustrates an example of a processor-based computing device system capable of adopting SoC device 10 of FIGS. 1 and 2 together with multi host controller 100 illustrated in FIGS. 1 and 2.

Referring to FIG. 7, the computing device system includes one or more central processing units (CPU) 1000 including at least one processor 1200. Central processing unit 1000 may include a cache memory 1100 coupled to processor 1200 for quick access to temporarily stored data.

Central processing unit 1000 may be coupled to system bus 2000 to mutually couple the devices included in the computing device system. As is well known, central processing unit 1000 may communicate with other devices by exchanging addresses, control commands and data information via system bus 2000.

For example, central processing unit 1000 may communicate the bus transaction requests with memory controller 1610 as an example of a slave device.

On the other hand, other devices may be connected to system bus 2000. As illustrated in FIG. 7, the computing devices system may include a memory system 1600, at least one input device 1800, at least one output device 1900, at least one network interface device 1700, and at least one display controller 1300.

Input device 1800 may include input keys, switches, audio processors and the like. However, the present embodiment is not limited thereto.

Output device 1900 may include audio, video, other visual indicators, and the like. However, the present embodiment is not limited thereto.

Network interface device 1700 may be any device that may transfer data to network 1710 and receive data from network 1710.

Network 1710 may include a wired or wireless network, a private or public network, a local area network (LAN), a wide area network, a wireless local area, Bluetooth (BT), and Internet. However, the present embodiment is not limited thereto.

Network interface device 1700 may be configured to support a particular type of communication protocol.

Memory system 1600 may include one or more memories 1620.

Central processing unit 1000 may also be configured to access display controller 1300 via system bus 2000 to control the information transferred to at least one display 1500.

Display controller 1300 may transfer information to display 1500 via at least one video processor 1400.

At this time, at least one video processor 1400 may process the information to be displayed in a format suitable for display 1500.

Display 1500 may include a cathode ray tube (CRT), a liquid crystal display (LCD), a light-emitting diode (LED), a plasma display, and the like. However, the present embodiment is not limited thereto.

The computing device system may include, for example, a set top box, an entertainment unit, a navigation device, a communication device, a fixed position data unit, a movement position data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc or digital versatile disc (DVD) player, a portable digital video player, and the like.

Hereinafter, the semiconductor device according to some embodiments will be described referring to FIGS. 1 and 8. Repeated contents of the above-described embodiments will be simplified or omitted.

Figure 8:
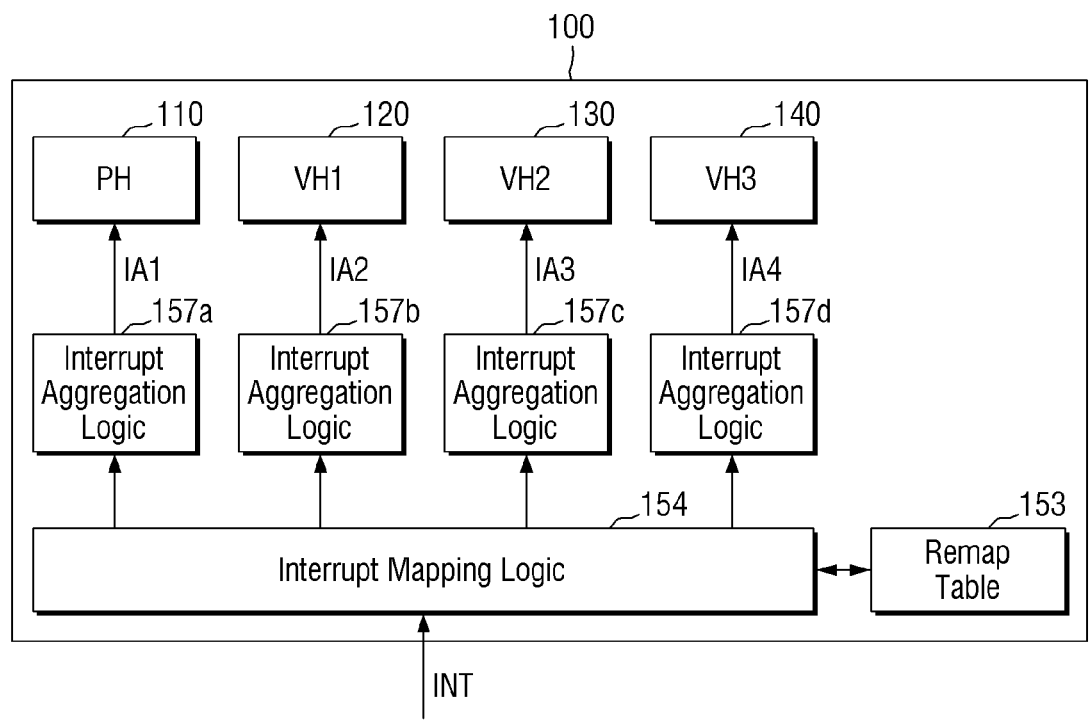
FIG. 8 is a block diagram for explaining interrupt aggregation of the semiconductor device according to some embodiments.

FIG. 8 is a block diagram for explaining interrupt aggregation of the semiconductor device according to some embodiments. In FIG. 8, necessary parts of the structure of multi host controller 100 are briefly illustrated for the sake of convenience.

Referring to FIGS. 1 and 8, multi host controller 100 of the semiconductor device according to some embodiments may include an interrupt mapping logic 154 and a plurality of interrupt aggregation logics 157a, 157b, 157c and 157d.

When receiving an interrupt INT from the processor, interrupt mapping logic 154 may transfer it to the plurality of interrupt aggregation logics 157a to 157d.

The plurality of interrupt aggregation logics 157a to 157d may correspond to physical host interface 110 and virtual host interfaces 120 to 140, respectively. Specifically, first interrupt aggregation logic 157a may correspond to physical host interface 110, and second interrupt aggregation logic 157b may correspond to first virtual host interface 120. Third interrupt aggregation logic 157c may correspond to second virtual host interface 130, and fourth interrupt aggregation logic 157d may correspond to third virtual host interface 140.

The plurality of interrupt aggregation logics 157a to 157d may collect a certain number of interrupts INT transferred from interrupt mapping logic 154 and transfer them to the respective host interfaces. When the plurality of interrupts INT are transferred to the plurality of I/O clients 410, 420, 430 and 440 each time an interrupt INT occurs, the operation of the plurality of I/O clients 410, 420, 430 and 440 is not smooth and efficiency may be lowered.

Therefore, when the interrupts INT reaches a certain number, the plurality of interrupt aggregation logics 157a to 157d may transfer the interrupts INT at one time, together, to improve the performance of the entire system.

Since multi host controller 100 of the semiconductor device according to some embodiments includes physical host interface 110 and virtual host interfaces 120 to 140, it is possible to separately collect the interrupts INT of each host interface. As a result, first interrupt aggregation logic 157a may transfer the first interrupt aggregation IA1 to physical host interface 110, and second interrupt aggregation logic 157b may transfer the second interrupt aggregation IA2 to first interrupt host interface 120. Also, third interrupt aggregation logic 157c may transfer the third interrupt aggregation IA3 to second virtual host interface 130, and fourth interrupt aggregation logic 157d may transfer the fourth interrupt aggregation IA4 to third virtual host interface 140.

To this end, interrupt mapping logic 154 may refer to remap table 153. Since the virtual ID of the transfer request matches remap table 153, it is possible to appropriately transfer the interrupt aggregation by referring to this.

Each of physical host interface 110 and virtual host interfaces 120 to 140 of this embodiment may interact with the processor and flash memory device 20 on a one-to-one basis through interrupt mapping logic 154 and plurality of interrupt aggregation logics 157a to 157d, and may operate without degradation of the performance.

Hereinafter, the semiconductor device according to some embodiments will be described with reference to FIGS. 1 and 9. Repeated contents of the above-described embodiments will be simplified or omitted.

Figure 9:
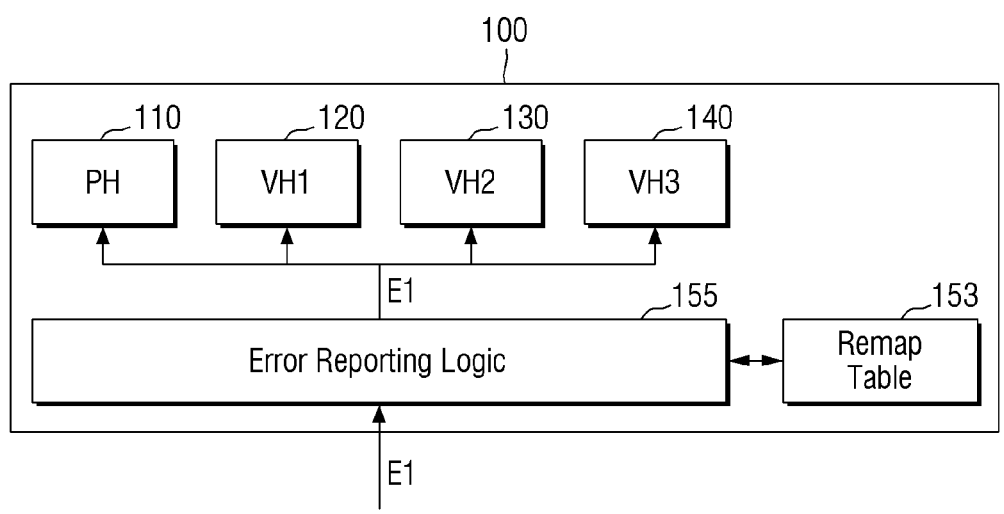
FIG. 9 is a block diagram for explaining error reporting of the semiconductor device according to some embodiments.

FIG. 9 is a block diagram for explaining error reporting of the semiconductor device according to some embodiments. For convenience, FIG. 9 briefly illustrates the necessary parts of the structure of multi host controller 100.

Referring to FIGS. 1 and 9, multi host controller 100 of the semiconductor device according to some embodiments may include error reporting logic 155.

When receiving the first error E1, error reporting logic 155 may report this to each of physical host interface 110 and virtual host interfaces 120 to 140. That is, physical host interface 110 and virtual host interfaces 120 to 140 may all receive the report of first error E1 from error reporting logic 155.

Here, the first error E1 may mean an error occurring in both of physical host interface 110 and virtual host interfaces 120 to 140. For example, the first error E1 may include an error that occurs in the connection channel to flash memory device 20 including interconnect 500.

Therefore, when the first error E1 occurs, the first error E1 may be transferred to each of physical host interface 110 and virtual host interfaces 120 to 140. Physical host interface 110 and virtual host interfaces 120 to 140 may individually cope with the first error E1.

Hereinafter, the semiconductor device according to some embodiments will be described with reference to FIGS. 1 and 10. Repeated contents of the above-described embodiments will be simplified or omitted.

Figure 10:
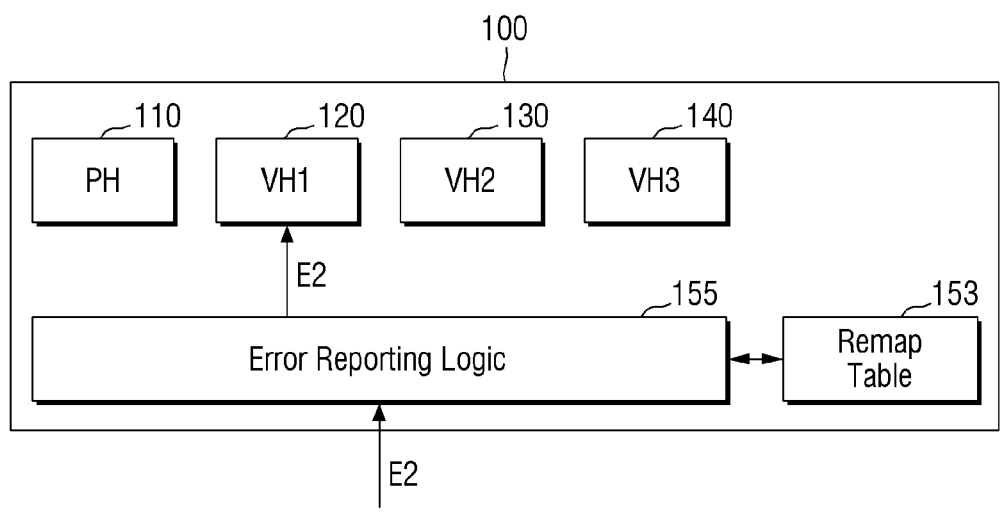
FIG. 10 is a block diagram for explaining the error reporting of the semiconductor device according to some embodiments.

FIG. 10 is a block diagram for explaining the error reporting of the semiconductor device according to some embodiments. For convenience, FIG. 10 briefly illustrates necessary parts of the structure of multi host controller 100.

Referring to FIGS. 1 and 10, when receiving a second error E2, error reporting logic 155 of the semiconductor device according to some embodiments may report it only to the corresponding host interface among physical host interface 110 and virtual host interfaces 120 to 140. FIG. 10 illustrates, for example, that the second error E2 is reported only to the first virtual host interface VH1.

Here, the second error E2 may mean an error that occurs only in a specific host interface among physical host interface 110 and virtual host interfaces 120 to 140.

For example, the second error E2 may include an error that occurs in flash memory device 20. Specifically, the second error E2 may include an error which occurs when accessing an area that may not be accessed by the I/O client corresponding to first virtual host interface 120 among the areas of flash memory device 20.

In the case of the second error E2, since it is sufficient that the second error is reported only to the corresponding host interface among physical host interface 110 and virtual host interfaces 120 to 140, the error E2 may not be reported to other host interfaces. In this embodiment, efficient operation may be performed through this.

To this end, error reporting logic 155 may refer to remap table 153. Since the virtual ID of the transfer request matches remap table 153, the second error E2 may be appropriately transferred with reference to this.

The various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

In concluding the detailed description, those skilled in the art will appreciate that many variations and modifications may be made to the preferred embodiments without substantially departing from the principles. Therefore, the disclosed preferred embodiments of the invention are used in a generic and descriptive sense only and not for purposes of limitation.

What is claimed is:

1. A semiconductor device, comprising:
a plurality of input/output (I/O) clients;
a virtual machine monitor;
a multi host controller, including:
a physical host interface,
at least one virtual host interface, and
an arbiter,
wherein the physical host interface and the at least one virtual host interface each interface a corresponding one of the plurality I/O clients to the virtual machine monitor, and
wherein the arbiter is configured to receive first transfer requests from the physical host interface and to receive second transfer requests from the at least one virtual host interface, and which is further configured to arbitrate the first transfer requests and the second transfer requests; and
a system memory which is configured to store a first transfer request list of the first transfer requests and a second transfer request list of the second transfer requests,
wherein the first transfer request list and the second transfer request list include a same number of slots as each other.

2. The semiconductor device of claim 1, wherein the multi host controller processes the first and second transfer requests in a predefined maximum number, n, where n is a positive integer and
wherein the number of respective slots of the first and second transfer request lists is n.

3. The semiconductor device of claim 1, wherein the arbiter is configured to receive first work management requests from the physical host interface, and to receive second work management requests from the at least one virtual host interface.

4. The semiconductor device of claim 3, wherein the system memory is configured to store a first work management request list of the first work management requests, and to store a second work management request list of the second work management requests.

5. The semiconductor device of claim 4, wherein a number of slots of the first work management request list and a number of slots of the second work management request list are the same as each other.

6. The semiconductor device of claim 1, further comprising:
a flash memory device; and
an interconnection which connects the multi host controller and the flash memory device.

7. The semiconductor device of claim 6, wherein the interconnection is managed by the physical host interface.

8. The semiconductor device of claim 1, wherein the at least one virtual host interface includes first and second virtual host interfaces.

9. The semiconductor device of claim 8, wherein the physical host interface, the first virtual host interface, and the second virtual host interface transfer first to third virtual IDs, respectively, to the multi host controller.

10. The semiconductor device of claim 9, wherein the arbiter comprises:
a scheduler which receives the first and second transfer requests and sequentially transfers the first and second transfer requests, and
a remapping module which generates a remapping table in which the first and second transfer requests are remapped and recorded using the first to third virtual IDs.

11. A multi host controller, comprising:
a physical host interface which transfers n first transfer requests, where n is a positive integer;
a first virtual host interface which transfers n second transfer requests;
a second virtual host interface which transfers n third transfer requests; and
an arbiter which receives 3n first to third transfer requests, and arranges and transfers n first to third transfer requests.

12. The multi host controller of claim 11, wherein the arbiter arranges the first to third transfer requests in a round-robin manner.

13. The multi host controller of claim 11, further comprising:
a transport protocol module which receives the n arranged first to third transfer requests and converts the n first to third transfer requests into a physical signal.

14. The multi host controller of claim 11, further comprising:
interrupt aggregation logic which receives a plurality of interrupts for each of the physical host interface and the first and second virtual host interfaces, aggregates the interrupts for each of the physical host interface and the first and second virtual host interfaces, respectively, and transfers an interrupt aggregation to each of the physical host interface, and the first and second virtual host interfaces.

15. The multi host controller of claim 11, further comprising error reporting logic which receives an error and reports the error to at least one of the physical host interface, and the first and second virtual host interfaces.

16. The multi host controller of claim 15, wherein, when the error is an error which needs be reported to the physical host interface, and the first and second virtual host interfaces, the error reporting logic reports the error to the physical host interface, and the first and second virtual host interfaces.

17. The multi host controller of claim 15, wherein, when the error is an error which needs to be reported to only some of the physical host interface, and the first and second virtual host interfaces, the error reporting logic reports the error to only one or more corresponding host interfaces among the physical host interface, and the first and second virtual host interfaces.

18. A semiconductor device, comprising:
a flash memory device; and
a system on chip (SoC) device which transfers a command to the flash memory device,
wherein the SoC device includes:
a plurality of input/output (I/O) clients,
a virtual machine monitor,
a multi host controller, including;
a physical host interface,
at least one virtual host interface, and
an arbiter,
wherein the physical host interface and the at least one virtual host interface each interface a corresponding one of the plurality I/O clients to the virtual machine monitor, and
wherein the arbiter is configured to receive a first transfer requests from the physical host interface and is further configured to receive a second transfer requests from the at least one virtual host interface, and to arbitrate the first transfer requests and the second transfer requests; and
a system memory which is configured to store a first transfer request list of the first transfer requests and a second transfer request list of the second transfer requests.

19. The semiconductor device of claim 18, wherein the flash memory device uses one of standards among a universal flash storage (UFS) standard and an embedded multimedia card (eMMC) standard.

20. The semiconductor device of claim 18, wherein the SoC device further comprises an interconnect which connects the flash memory device and the multi host controller, and wherein the physical host interface manages the interconnect.

* * * * *